US012776212B2

(12) United States Patent
Tarchala et al.

(10) Patent No.: US 12,776,212 B2
(45) Date of Patent: Oct. 27, 2026

(54) INCIDENT HANDLING SYSTEM FOR MOTOR VEHICLES

(71) Applicant: Honda Motor Co., Ltd., Tokyo (JP)

(72) Inventors: Christopher John Tarchala, Torrance, CA (US); Dillon Kane, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 18/625,423

(22) Filed: Apr. 3, 2024

(65) Prior Publication Data

US 2025/0316168 A1 Oct. 9, 2025

(51) Int. Cl.
*G08G 1/0967* (2006.01)
*B60W 60/00* (2020.01)

(52) U.S. Cl.
CPC ... *G08G 1/096725* (2013.01); *B60W 60/0025* (2020.02); *B60W 2556/65* (2020.02); *B60W 2710/30* (2013.01); *B60W 2720/28* (2013.01)

(58) Field of Classification Search
CPC ......... B60W 2556/65; B60W 2710/30; B60W 2720/28; B60W 60/0025; G08G 1/096725
See application file for complete search history.

(56) References Cited

U.S. PATENT DOCUMENTS

| | | | | |
|---|---|---|---|---|
| 9,751,463 | B1 * | 9/2017 | Ramcharitar | G08G 1/052 |
| 10,403,140 | B2 | 9/2019 | Banvait et al. | |
| 11,120,647 | B1 | 9/2021 | Brandmaier et al. | |
| 2018/0137756 | A1 * | 5/2018 | Moosaei | G08G 1/09675 |
| 2020/0082726 | A1 * | 3/2020 | Kumar | G05D 1/0088 |
| 2023/0303121 | A1 * | 9/2023 | Kaur | H04W 4/90 |
| 2024/0059323 | A1 * | 2/2024 | Gerrese | H04W 4/023 |
| 2024/0127638 | A1 * | 4/2024 | Bradley | G07C 5/0808 |
| 2025/0222963 | A1 * | 7/2025 | Davis | B60Q 1/52 |

FOREIGN PATENT DOCUMENTS

| | | | |
|---|---|---|---|
| KR | 101615970 | B1 | 4/2016 |
| KR | 102011598 | B1 | 8/2019 |

* cited by examiner

*Primary Examiner* — Jerrod Irvin Davis
(74) *Attorney, Agent, or Firm* — Plumsea Law Group, LLC

(57) ABSTRACT

Methods and systems that allow one or more vehicles to take automated actions in response to a vehicle incident. Vehicle-to-vehicle communications are used to convey information about a vehicle incident to other vehicles in the vicinity of the incident site. The automated actions include warning nearby drivers of the incident by deploying a visual signal or beacon, such as engaging hazard lights on nearby vehicles. The automated actions may also include routing one or more vehicles to various locations around the incident site to provide a protective barrier and/or to facilitate guiding vehicles to and/or around the incident site.

20 Claims, 9 Drawing Sheets

INCIDENT HANDLING SYSTEM FOR MOTOR VEHICLES

BACKGROUND

The present disclosure relates to motor vehicles and in particular to systems for managing vehicle incidents.

Identifying, reporting, and responding to accidents often relies on manual observations and actions by other drivers on a roadway. Information about accidents can also be conveyed using vehicle-to-vehicle communications. However, such methods are limited to reporting accident information.

There is a need in the art for a system and method that addresses the shortcomings discussed above.

SUMMARY

Embodiments provide herein disclose methods and systems for automated responses to vehicle incidents.

In some aspects, the techniques described herein relate to a motor vehicle, including: a communication system for communicating with at least one other motor vehicle; an autonomous control system for autonomously controlling the motor vehicle; wherein the motor vehicle is configured to: receive a message, at the communication system, indicating that a vehicle incident has occurred at a first location; and autonomously drive the motor vehicle, using the autonomous control system, to a second location in response to receiving the message.

In some aspects, the techniques described herein relate to a vehicle, including: a communication system for communicating with at least one other vehicle; a signaling system; wherein the vehicle is configured to: receive a message, at the communication system, indicating that a vehicle incident has occurred; and autonomously activate the signaling system to provide a signal to nearby vehicles indicative of the vehicle incident.

In some aspects, the techniques described herein relate to a method, including: receiving a message, at a first motor vehicle, from a second motor vehicle, the message indicative of a vehicle incident at an incident location; autonomously activating a signaling system in the first motor vehicle; autonomously slowing a speed of the first motor vehicle; and autonomously driving the first motor vehicle to a target location.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments may be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

As used herein, the term “vehicle incident” may include accidents involving one or more vehicles, a broken-down vehicle, or any other incident where a vehicle and/or its occupants may need assistance. The place where the vehicle incident occurs may be referred to as an “incident site.”

When vehicle incidents, such as accidents, occur on or along a roadway with traffic, there may be risks to both those involved in the incident and responders (such as emergency vehicles) trying to provide assistance at the site of the incident. To facilitate the safety of those involved in the incident and to facilitate assistance from first responders and other parties, the embodiments provided herein disclose methods and systems that allow one or more vehicles to take automated actions in response to a vehicle incident.

The systems and methods use vehicle-to-vehicle (“V2V”) communications to convey information about a vehicle incident to other vehicles passing by, or otherwise in the vicinity of, the incident site. In response to receiving these messages, vehicles of the embodiments may take automated actions. The automated actions may include warning nearby drivers of the incident by deploying a visual signal or beacon, such as engaging hazard lights on nearby vehicles. The automated actions may also include autonomously driving one or more vehicles to various locations around the incident site to provide a protective barrier and/or to facilitate guiding vehicles to and/or around the incident site. Thus, the systems and methods allow for a coordinated response to a vehicle incident that may protect vehicles and/or occupants associated with the vehicle incident by warning nearby drivers and/or by providing physical barriers between the incident site and other vehicles driving along the road where the incident has occurred.

Figure 1:
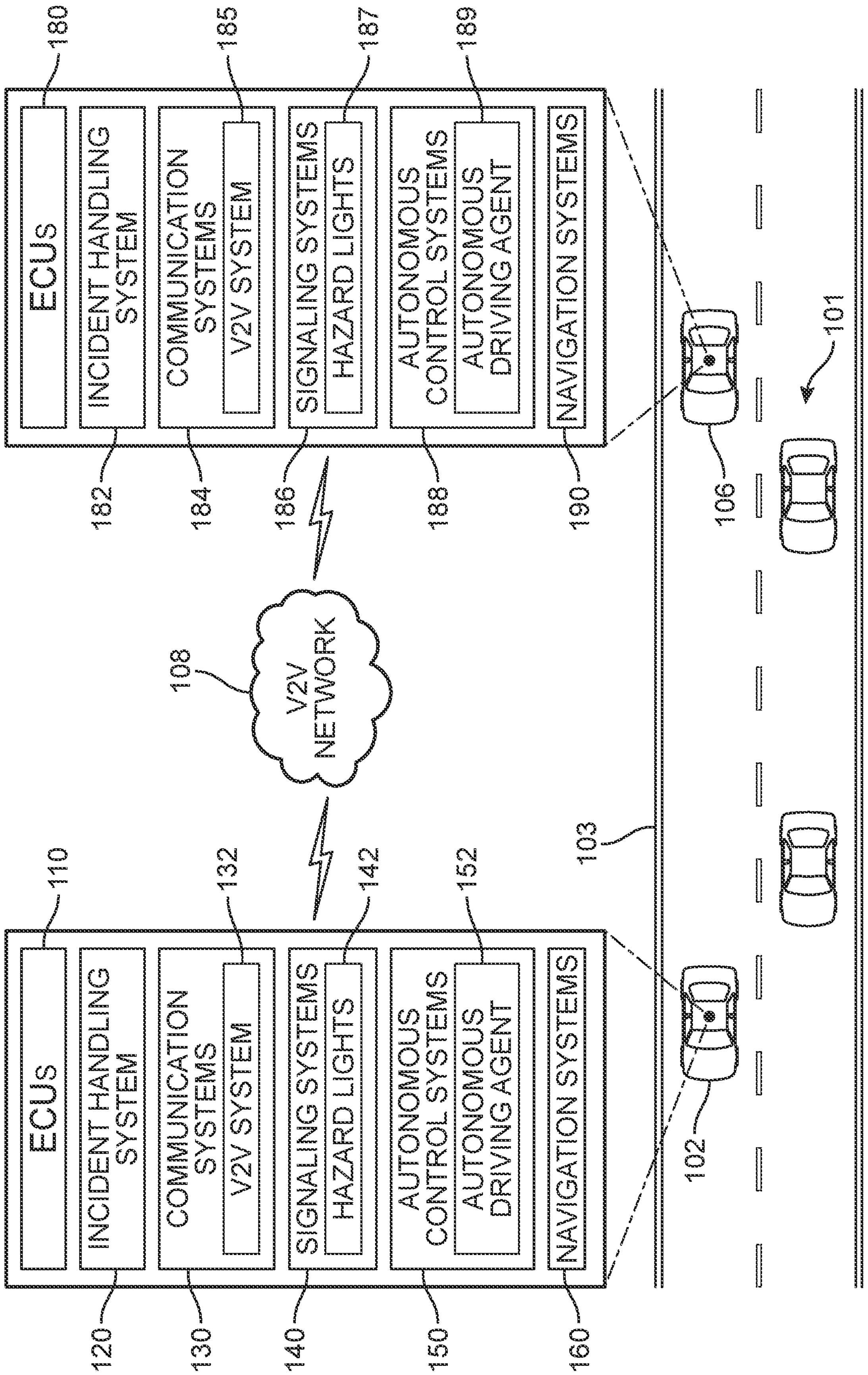
FIG. 1 is a schematic view of an architecture for a system that autonomously responds to vehicle incidents, according to an embodiment.

FIG. 1 is a schematic view of an architecture for a system that autonomously responds to vehicle incidents, according to an embodiment. Referring to FIG. 1, a plurality of vehicles 101 are shown driving on a roadway 103. One or more of vehicles 101, including a motor vehicle 102 and a motor vehicle 106, may be equipped with systems that facilitate autonomous incident handling. The vehicles 101 may be non-autonomous vehicle, semi-autonomous vehicles, or fully autonomous vehicles, for example, as defined by National Highway Traffic Safety Administration (NHTSA). Examples of the vehicles 101 may include, but are not limited to, a three-wheeler vehicle, a four-wheeler vehicle, a hybrid vehicle, or a vehicle with autonomous drive capability that uses one or more distinct renewable or non-renewable power sources. The vehicles 101 may use renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicles 101 may have load carrying capabilities that uses one or more distinct trailers. It should be noted here that the vehicles 101 shown in FIG. 1 are four-wheeler vehicles, which is merely an example.

In some embodiments, motor vehicle 102 may comprise hardware and software components. In particular, motor vehicle 102 may include or more electronic control units 110 (ECUs 110). ECUs 110 may comprise one or more discrete computing systems that may each include one or more processors, as well as non-transitory computer-readable media (memory) for storing instructions that may be executed by the one or more processors.

In some embodiments, motor vehicle 102 may include an incident handling system 120, communication systems 130, signaling systems 140, autonomous control systems 150, and navigation systems 160. Each of these systems may comprise a suitable combination of hardware and software and may be operated using one or more processors, memory, and/or ECUs, including ECUs 110.

Incident handling system 120 may comprise hardware and/or software that facilitates identifying and responding to a vehicle incident. Incident handling system 120 may communicate with one or more of communication systems 130, signaling systems 140, autonomous control systems 150, and navigation systems 160 as discussed in further detail below.

Communication systems 130 comprise one or more systems for facilitating communication, including communication with other vehicles and/or other systems. Communication systems 130 may comprise one or more suitable devices, chips, cards, or other systems for communicating over wired and/or wireless networks. Suitable networking components may include a Wi-Fi card, a cellular network card, a Personal Area Network (PAN) card, a Near Field Communication (NFC) chip, a transceiver and antenna for dedicated short-range communications, as well as other suitable components to facilitate wireless communication between systems of a vehicle and other systems. In some embodiments, communication systems 130 includes a vehicle-to-vehicle ("V2V") communication system 132. V2V technology allows vehicles to share information wirelessly, including telematics information, as well as other kinds of information. In some embodiments, communication between vehicles is enabled using dedicated short-range communications (DSRC). In some embodiments, V2V system 132 facilitates communication over a range of approximately 0 to 400 meters.

Signaling systems 140 comprise one or more systems onboard of motor vehicle 102 that may be used to provide signaling that may be detected by nearby vehicles and/or users. As one example, hazard lights 142 of motor vehicle 102 may be used to signal other vehicles/drivers. Signaling systems 140 may also include any other lights associated with motor vehicle 102, as well as audible systems such as the vehicle's horn, and any external speakers. As discussed in further detail below, using signaling systems 140, incident handling system 120 may operate motor vehicle 102 in a beaconing (or signaling) mode, in which motor vehicle 102 provides a visual or audible warning to nearby vehicles in response to detecting an incident.

Autonomous control systems 150 may comprise both systems for directly controlling a vehicle as well as autonomous driver assistance systems. For example, autonomous control systems 150 may include control systems that facilitate autonomous driving. Exemplary control systems used for autonomous driving include drive-by-wire systems, specifically throttle by wire, brake by wire, shift by wire, steer by wire, and other electrical control systems to facilitate autonomous driving.

In some embodiments, autonomous control systems 150 may make use of suitable onboard technologies and sensors to autonomously drive motor vehicle 102 from one location to another. These may include adaptive cruise control, anti-lock brake systems, active steering, as well as suitable sensors such as Light Detection and Ranging (LIDAR) sensors and radar systems. Autonomous control systems 150 may also use Global Positioning System (GPS) or Global Navigation Satellite System (GNSS) navigation technology.

Autonomous control systems 140 may also include an autonomous driving agent 152. Autonomous driving agent 152 may comprise processors, circuitry, memory, and software for implementing autonomous driving. In particular, autonomous driving agent 152 may take in information from one or more sensors, make autonomous decisions, and implement automated driving controls via drive-by-wire or other autonomous control systems 150.

Navigation systems 160 may comprise one or more resources, including a geographic information system (GIS), and a global navigation satellite system (GNSS). In some cases, navigation systems 160 include a global positioning system (GPS) receiver for identifying a position of motor vehicle 102. Navigation systems 160 may also comprise one or more algorithms for finding routes between a current location of motor vehicle 102 and a destination.

In the exemplary architecture, one or more vehicles may be equipped with similar provisions to motor vehicle 102. This allows both V2V communication, as well as the ability of the system to provide a coordinated response to a vehicle incident that uses beaconing and/or automated routing of multiple vehicles simultaneously. As seen in FIG. 1, second vehicle 106 includes similar components and provisions. These may include ECUs 180, incident handling system 182, communication systems 184, V2V system 185, signaling systems 186, hazard lights 187, autonomous control systems 188, autonomous driving agent 189, and navigation systems 190. For purposes of clarity, components for only two of the four vehicles shown in FIG. 1 are illustrated. However, it may be appreciated that in some embodiments multiple vehicles may include substantially similar provisions.

Using respective V2V systems (in particular, V2V system 132 and V2V system 185), motor vehicle 102 and motor vehicle 106 can communicate over a V2V network 108.

Figure 2:
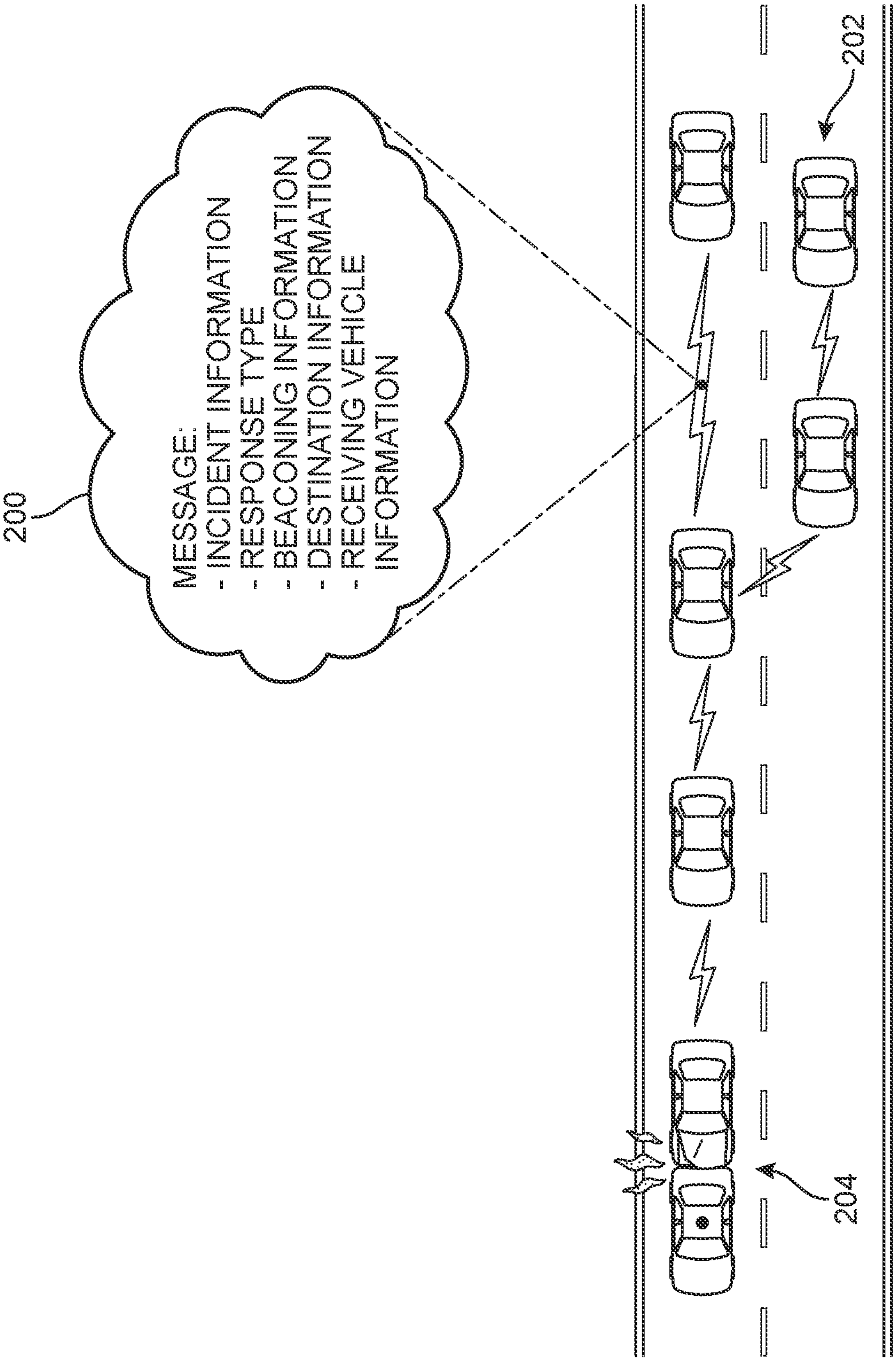
FIG. 2 is a schematic view of a plurality of vehicles that exchange messages with one or more vehicles involved in an incident and with one another, according to an embodiment.

FIG. 2 is a schematic view of a plurality of vehicles 202 that exchange messages with one or more vehicles involved in an incident (e.g., vehicles 204) and with one another. Referring now to FIG. 2, motor vehicles can pass messages with various kinds of information related to vehicle incidents. Messages may be passed using V2V communications and/or any other suitable communication protocols or methods.

As shown in FIG. 2, an exemplary message 200 may include various kinds of information that may be useful for an incident handling system. In some cases, a message may include "incident information." Incident information may include information about any vehicles involved in an incident. Such information may include, for example, vehicle make and model, color, location (determined, for example, using the vehicles own GPS system), telematics information (such as velocity, acceleration, braking, and steering information), as well as other suitable information. In some cases, vehicle information may also include information about the status of any vehicles involved in the incident, such as whether any vehicles are in need of assistance from emergency services, from a tow truck, or other status information. Incident information may also include information about the type of incident that has occurred. For example, the system could use categorical variables to distinguish between different kinds of incidents, such as "vehicle-vehicle collision," "pedestrian-vehicle collision," "vehicle break-down," or other kinds of incidents that may require an autonomous response.

In some cases, a message may include a "response type," which helps the incident handling system determine the appropriate type of action to take. For example, the response type could be "beaconing," (or "signaling") to indicate that nearby vehicles should behave as beacons to provide warnings and/or guidance to other vehicles. Also, the response type could be "routing" to indicate that the nearby vehicles should be autonomously routed (that is, driven) to one or more locations adjacent to the incident site to provide a protective barrier to the incident site and/or to provide other assistance. A message may also include "beaconing information." For example, in situations where a vehicle is instructed to enter a beaconing mode, the beaconing information could include information about the type of signaling to be used (for example, hazard lights or another type of signaling system). Beaconing information may also include information about a region where beaconing should be active. For example, vehicles that are within a suitable distance of the vehicle incident site may be put into a beaconing mode, while vehicles that have already passed the vehicle incident site may not need to continue in a beaconing mode. In such cases, a beaconing region (also referred to as a "signaling region") can be defined, and sent as part of the beaconing information.

A message can also include "destination information". Destination information may include a location where one or more vehicles should be autonomously routed to provide protection and/or assistance at the incident site. In some cases, destination information may include a location, for example, a GPS location. In other cases, destination information includes routing information to indicate the route or path a vehicle should take in moving to a target destination. In particular, in situations where multiple vehicles need to be moved to multiple locations around an incident site, information about specific routes (and timing of the routes) may be provided to prevent collisions between two or more vehicles enroute to their respective locations.

In some embodiments, messages may be directed to particular vehicles, rather than all vehicles nearby to the vehicle incident site. For example, messages could be directed to vehicles directly behind a vehicle in a collision. Such messages may include "receiving vehicle information," that indicates information about the vehicles for which the messages are intended. This information could include, for example, vehicle handles or other identification information that determines which vehicles are the intended recipient(s) for the message.

Messages may be sent and received directly between a vehicle involved in an incident and other vehicles, as well as between two or more vehicles not involved in the incident. In some cases, relevant response regions may be defined such that only vehicles receiving messages directly from a vehicle involved in the incident may take action. In some cases, relevant response regions may be defined such that only vehicles receiving messages from within a predetermined distance of the incident may take action.

Figure 3:
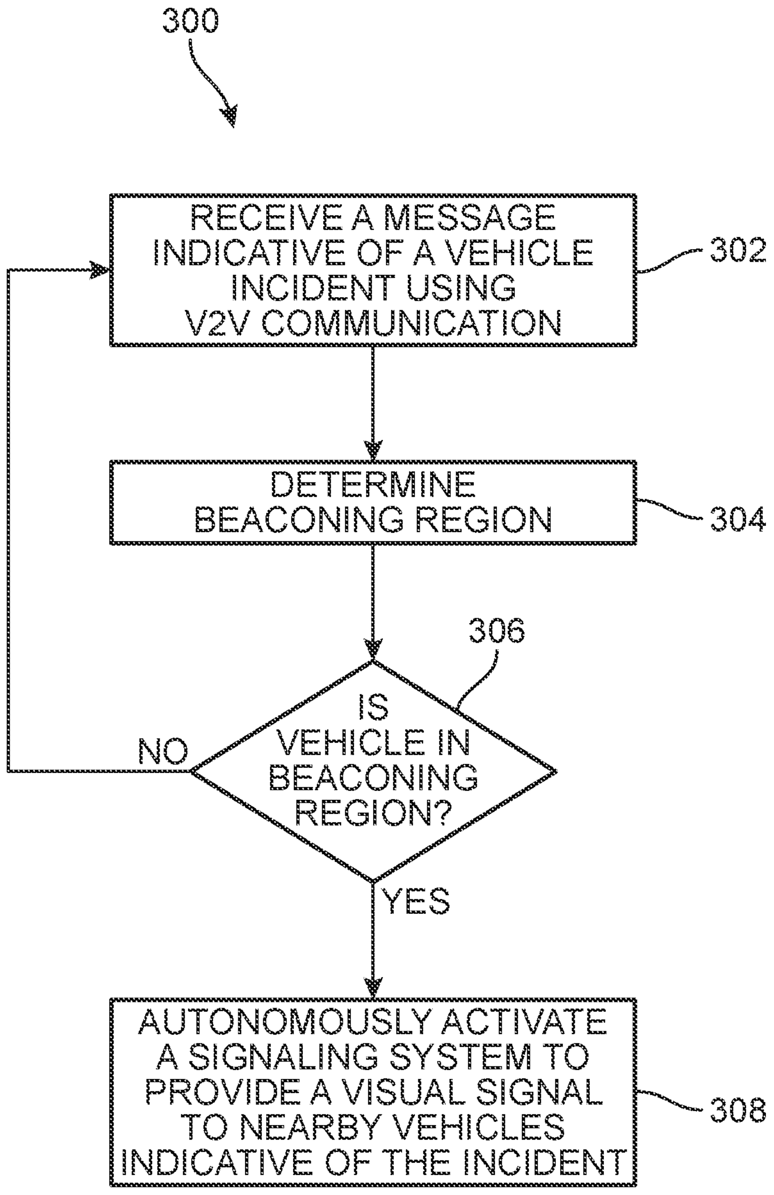
FIG. 3 is a schematic view of a process for autonomously controlling a motor vehicle to act as a beacon in response to receiving a message about a nearby vehicle incident, according to an embodiment.

FIG. 3 is a schematic view of a process for autonomously controlling a vehicle to act as a beacon in response to receiving a message about a nearby vehicle incident. In some embodiments, one or more of the following operations could be performed by an incident handling system (such as incident handling system 120 of FIG. 1) in cooperation with other vehicle systems. Starting in operation 302 of process 300, incident handling system 120 may receive a message indicative of a vehicle incident from another vehicle using V2V communication. The message may include suitable information, such as the incident location, a beaconing region, and information about the type of signaling system to be used.

In operation 304, incident handling system 120 determines the beaconing region, for example, by extracting the beaconing region from the received message. In some cases, a beaconing region may be defined by a radius around a central location (such as the incident location). In some cases, a beaconing region could be given as a polygonal boundary defined by the GPS locations of its vertices.

In operation 306, incident handling system 120 determines if the vehicle is currently in the beaconing region, for example, by determining the vehicle's GPS location and comparing this location with the beaconing region. If the vehicle is not in the beaconing region, incident handling system 120 may return to operation 302 to continue receiving new message information. If, however, the vehicle is determined to be in the beaconing region, incident handling system 120 may proceed to operation 308.

In operation 308, incident handling system 120 may autonomously activate a signaling system (such as signaling system 140) to provide a visual signal to nearby vehicles that is indicative of a problem, including a possible vehicle collision or other incident. In some cases, incident handling system 120 automatically activates a vehicle's hazard lights.

In some cases, rather than determine a beaconing region, a system could select a subset of vehicles known to be in the vicinity of the incident site to activate their beaconing mode. That is, in some cases, only some vehicles may be instructed to enter the beaconing mode. These vehicles could be specified using, for example, vehicle identification information provided as part of the received message.

Alternatively, some embodiments may not define a beaconing region. Instead, all vehicles that receive messages indicative of the incident may enter a beaconing mode.

It may be appreciated that process 300 may occur in multiple vehicles around an incident site such that multiple vehicles enter a beaconing mode and provide a warning to other vehicles. Moreover, in some embodiments, decisions may be made by individual vehicles independently of other vehicles. In other embodiments, decisions could be centralized and made by a supervising system operating on one vehicle in the network of vehicles.

Figure 4:
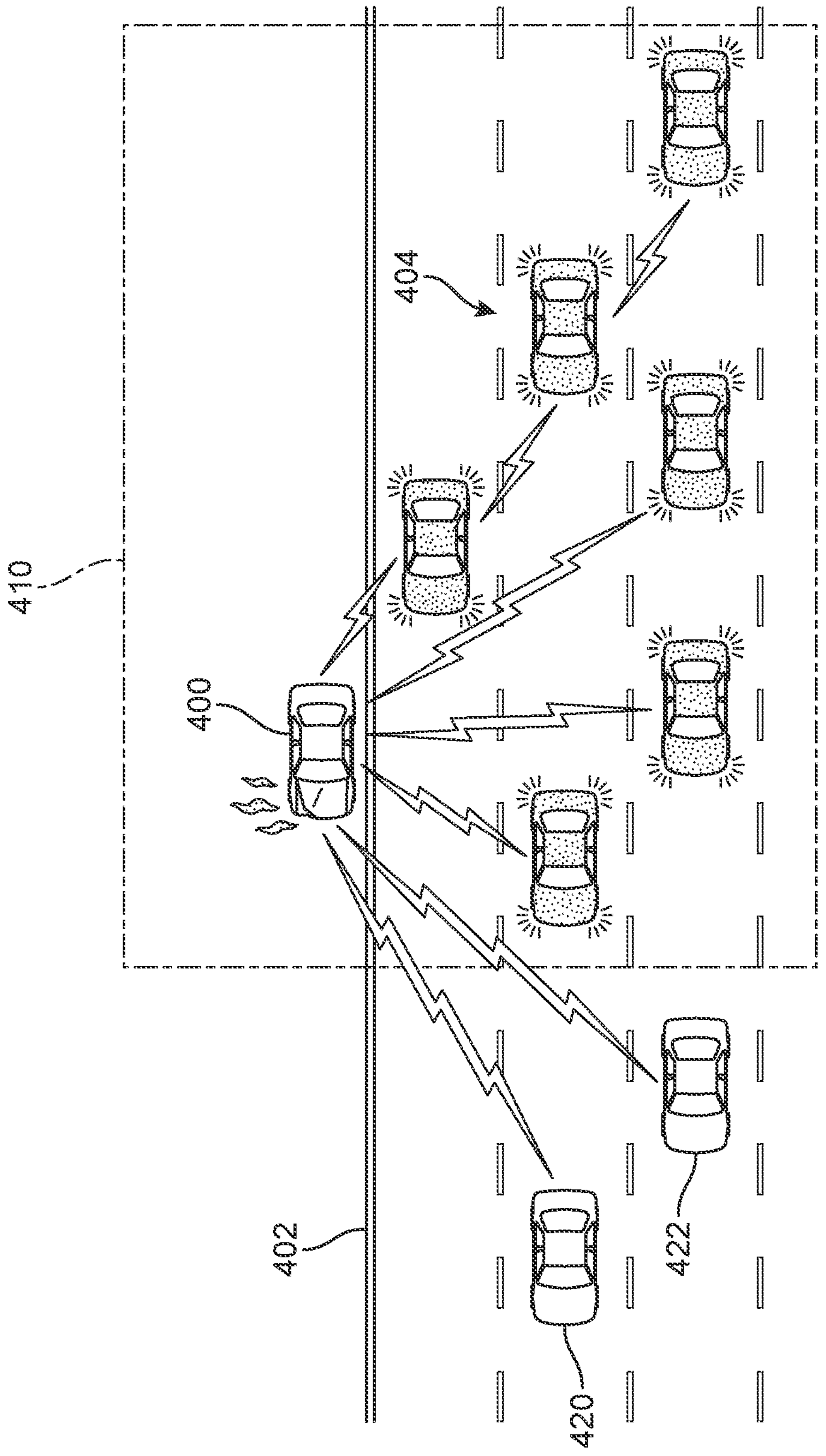
FIG. 4 is a schematic view of a scenario in which multiple vehicles initiate a beaconing mode in response to receiving V2V communications about a nearby vehicle incident, according to an embodiment.

FIG. 4 is a schematic view of a scenario in which multiple vehicles initiate a beaconing mode in response to receiving V2V communications about a nearby vehicle incident, according to an embodiment. Referring to FIG. 4, a vehicle 400 is broken down on the side of a highway 402 with a plurality of vehicles 404 nearby. Using V2V communication, vehicle 400 sends messages with information about the vehicle incident. This information may be determined by diagnostic systems onboard of vehicle 400, for example.

This information may include a beaconing region 410 (for example, GPS coordinates for the corners of a rectangular region) around vehicle 400, as well as instructions for vehicles within beaconing region 410 to activate a signaling system (such as hazard lights). As seen in FIG. 4, vehicles within beaconing region 410 are put in a beaconing mode, while some vehicles, such as vehicle 420 and vehicle 422, receive communication from vehicle 400, but are outside of beaconing region 410 and therefore do not initiate the beaconing mode (or have recently disengaged the beaconing mode after leaving the beaconing region).

Figure 5:
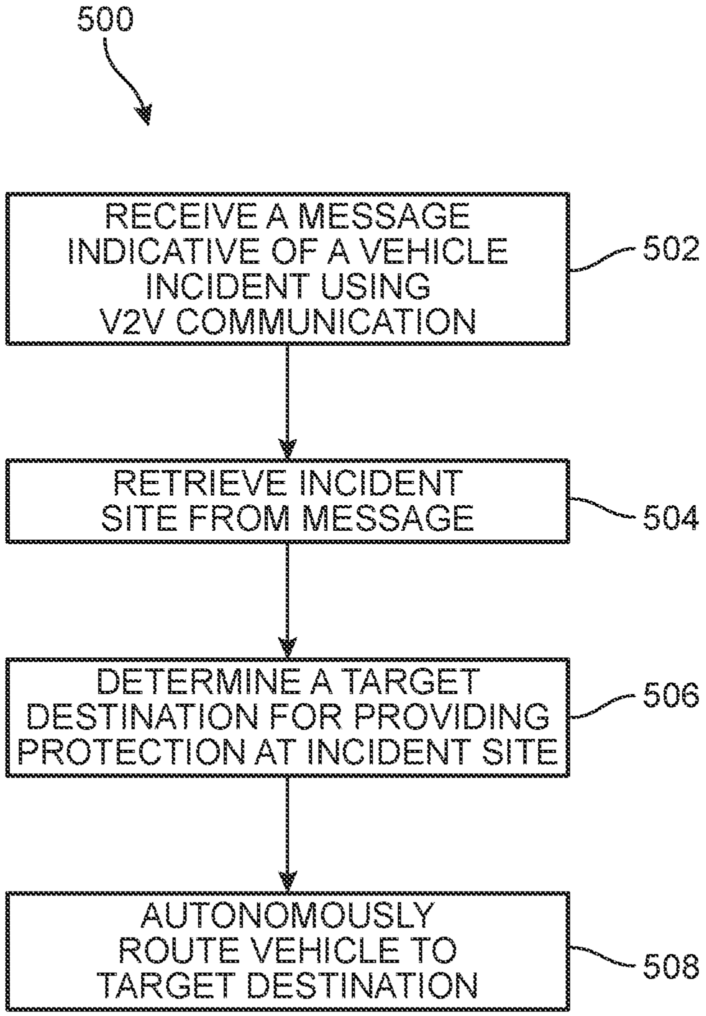
FIG. 5 is a schematic view of a process for autonomously routing a motor vehicle to a location near an incident to provide protection or other assistance, according to an embodiment.

FIG. 5 is a schematic view of a process for autonomously routing a vehicle to a location near an incident to provide protection or other assistance. In some embodiments, one or more of the following operations could be performed by an incident handling system (such as incident handling system 120 of FIG. 1) in cooperation with other vehicle systems. Starting in operation 502 of process 500, incident handling system 120 may receive a message indicative of a vehicle incident from another vehicle using V2V communication. The message may include suitable information, including any of the information described above and shown in FIG. 2. In some cases, the message may include information about the incident site. In some cases, the message may include information about routing destinations for one or more vehicles.

In operation 504, incident handling system 120 may retrieve an incident site (and/or a location of a vehicle involved in an incident) from the message received in operation 502. In some cases, this includes a GPS location, and/or a region defined by one or more GPS locations.

In operation 506, incident handling system 120 may determine a target destination for the vehicle. The target destination may be a location near the incident site such that placing the vehicle at the target destination helps protect, or otherwise assist, vehicles and/or persons involved in the vehicle incident. Examples of target destinations are shown in FIGS. 6 and 7 below.

In some cases, the target destination may be provided as an absolute location (for example, a GPS location). In some cases, the target destination may be provided as a relative location, for example, a location relative to the incident site or a location relative to another vehicle that is also responding to the incident. As an example, in one embodiment, the system may retrieve a GPS location for the incident site in operation 504 and then may receive information to indicate the target destination is “ten feet to the south” of the incident location.

In operation 508, incident handling system 120 may autonomously route (or drive) the vehicle to the target destination. In some cases, the autonomous routing is performed by, or in cooperation with, one or more autonomous control systems (such as autonomous control systems 150 of FIG. 1).

Figure 6:
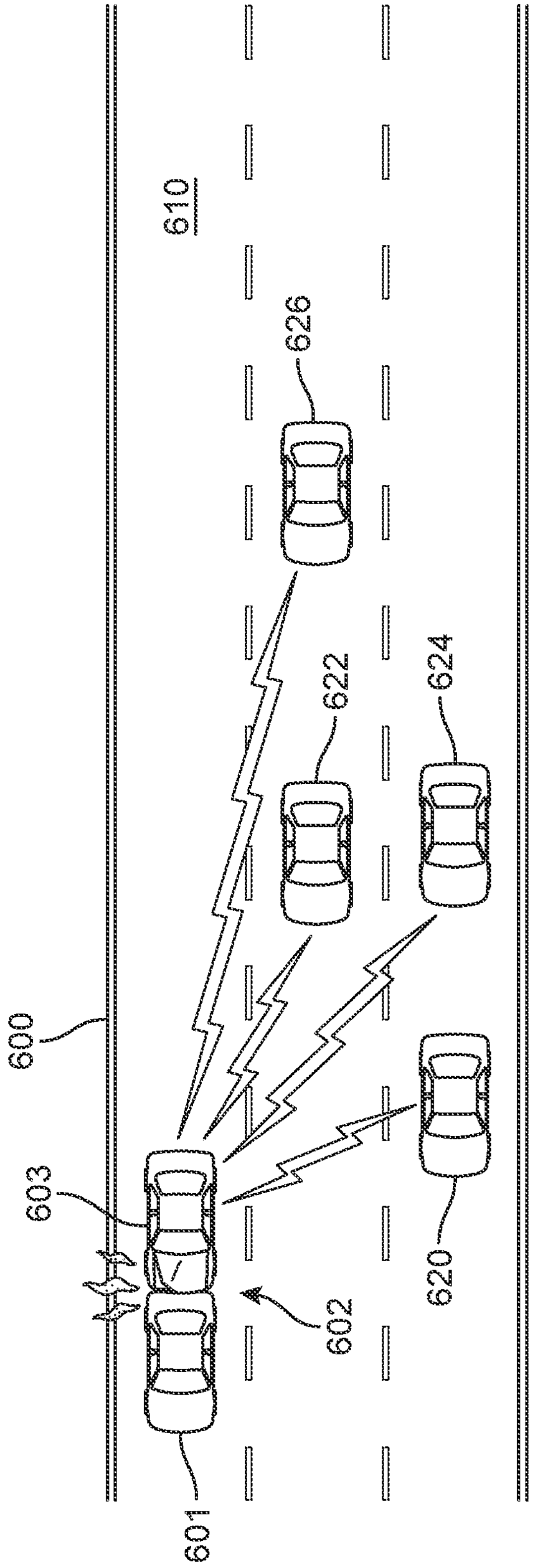
FIGS. 6 and 7 are schematic views of a scenario in which multiple vehicles are routed to target destinations around a vehicle incident to form a protective barrier around the vehicles and persons involved in the incident, according to an embodiment.
Figure 7:
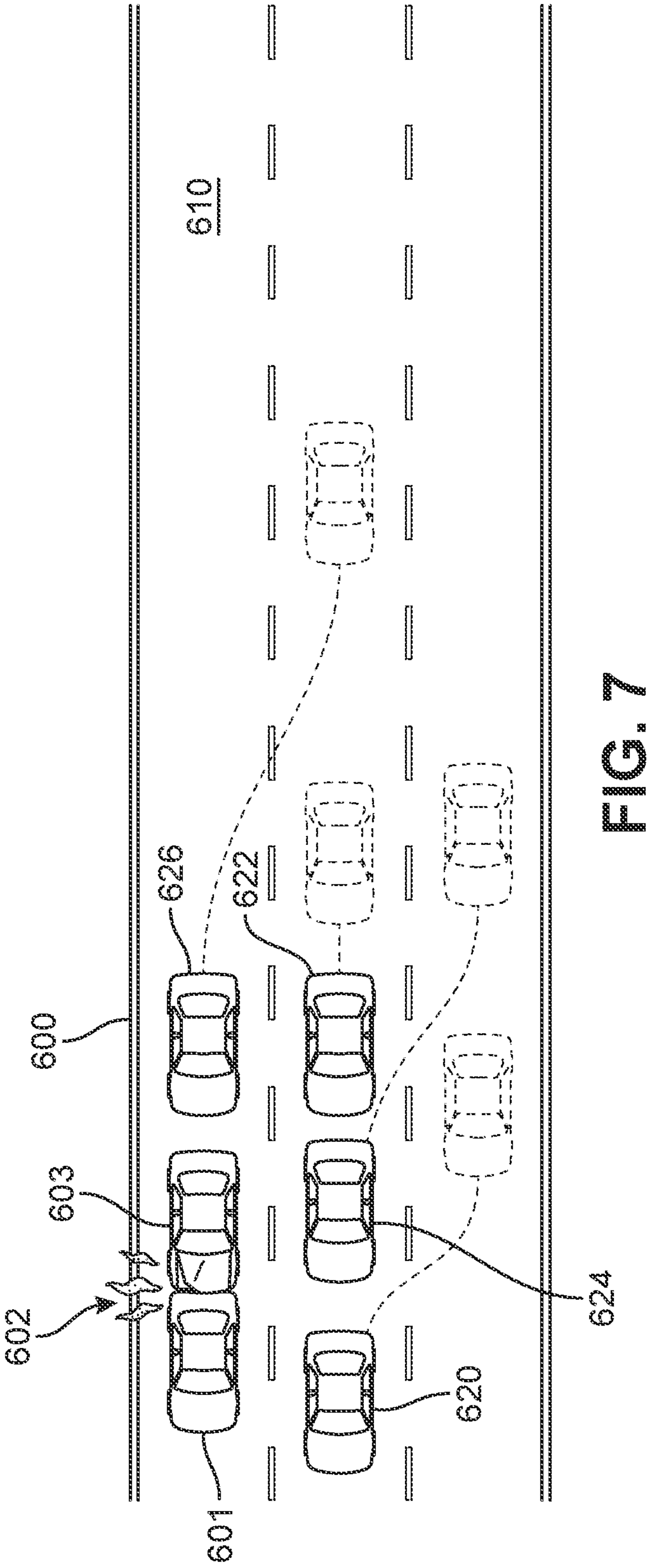

FIGS. 6 and 7 are schematic views of a scenario in which multiple vehicles are routed (driven) to target destinations around a vehicle incident to form a protective barrier around the vehicles and persons involved in the incident. As seen in FIG. 6, a vehicle incident 602 occurs in a first lane 610 of a highway 600. In this case, a first vehicle 601 collides with a second vehicle 603. One or more passing vehicles may communicate with either or both of first vehicle 601 and second vehicle 603 using V2V communications.

Based on the received messages, multiple passing vehicles may receive a request to provide protection around the vehicle incident site. In response to receiving the messages, multiple vehicles may be autonomously routed to target destinations around the incident site. As seen in FIGS. 6-7, third vehicle 620, fourth vehicle 622, fifth vehicle 624 and sixth vehicle 626 are all autonomously routed to target destinations such that the vehicles form a barrier or perimeter around first vehicle 601 and second vehicle 603. This configuration may provide protection to vehicles and/or persons involved in the vehicle incident, including protection from other rearwardly approaching vehicles and vehicles changing lanes on the highway.

In some embodiments, a centralized system either onboard one of the vehicles involved in the incident, or onboard one of the nearby vehicles, may coordinate routing multiple vehicles around the incident site to form a barrier. For example, each vehicle responding to the incident message may be assigned a specific target location from a set, or configuration, of target locations arranged so as to create a protective barrier.

The embodiments could make use of template formations (or configurations) of vehicles around an incident site. The template formations may include the target locations for a given number of vehicles around an incident site. Different formations may be stored in memory and selected according to specific details of the incident. For example, larger incidents involving multiple vehicles may require a larger number of vehicles to surround the incident site and provide a protective barrier. Similarly, the type of barrier pattern used may differ according to the size of, and activity of traffic along, a particular highway.

Figure 8:
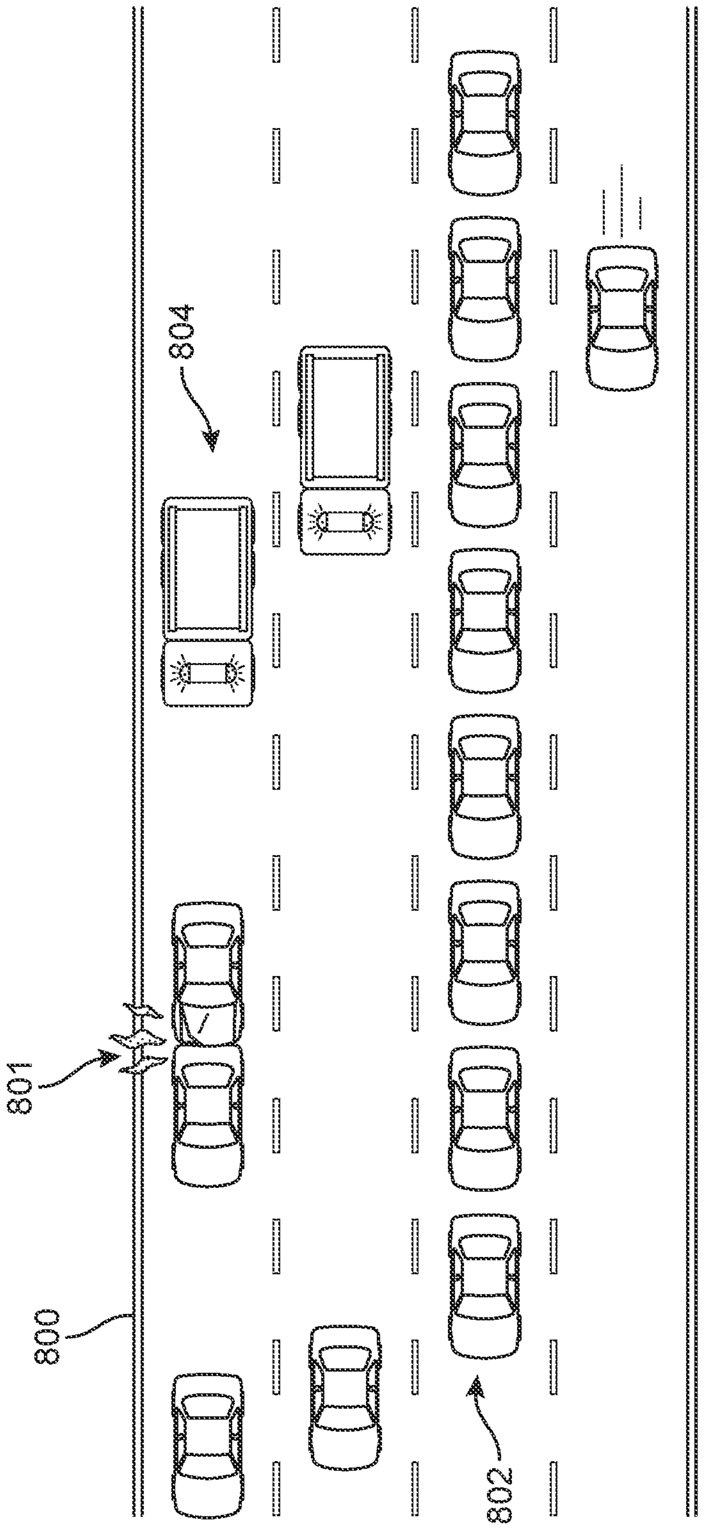
FIG. 8 is a schematic view of a plurality of vehicles that have been autonomously routed to target destinations such that they collectively provide a barrier to the left side of the incident site, as well as two lanes to access the incident site from the rearward side, according to an embodiment.

In some embodiments, vehicles may be autonomously routed so that the resulting configuration of vehicles provides assistance to emergency vehicles attempting to respond to the vehicle incident. As seen in FIG. 8, a plurality of vehicles 802 traveling on roadway 800 have been autonomously routed to target destinations such that they collectively provide a barrier to the left side of an incident 801, as well as two lanes to access the incident site from the rearward side. The configuration provides sufficient room for two emergency vehicles 804 to access the incident site.

In some embodiments, a combination of beaconing and autonomous routing can be used to provide both physical barriers and to visually warn nearby drivers of a vehicle incident. For example, in another embodiment, some vehicles could form a protective barrier around an incident site across two lanes of a highway, while other vehicles traveling by the incident in a third lane could be put in a beaconing mode.

Figure 9:
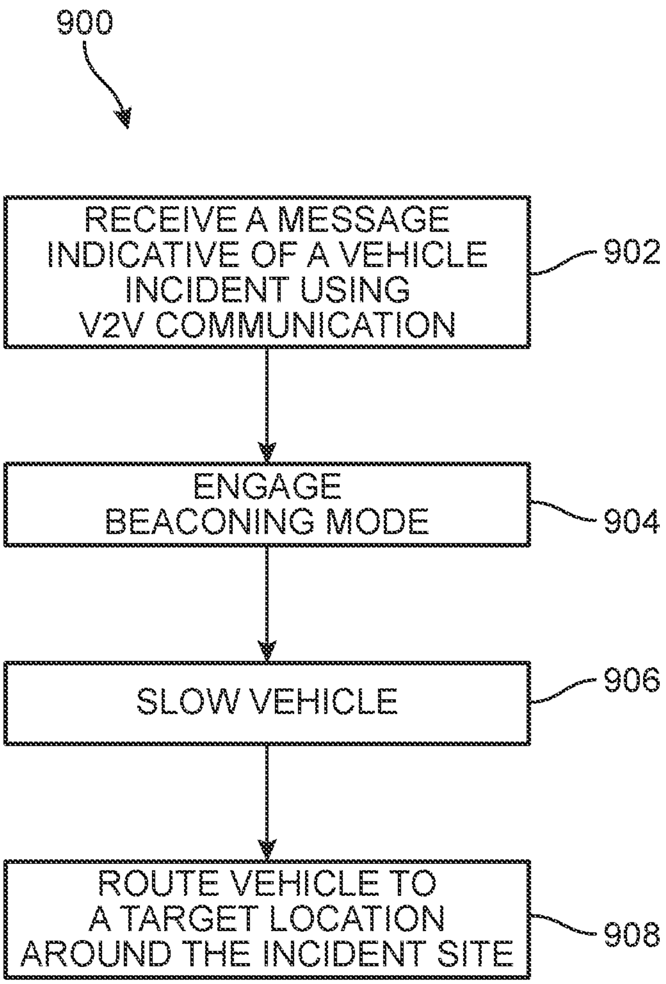
FIG. 9 is a schematic view of a process for engaging both signaling and routing in a vehicle in response to an incident, according to an embodiment.

In some embodiments, an incident handling system may control vehicles to engage both signaling and autonomous routing as part of a sequence. Referring to the exemplary process 900 of FIG. 9, incident handling system 120 may receive a message indicative of a vehicle incident using V2V communication in operation 902. Next, in operation 904, incident handling system 120 automatically turns on a vehicle’s hazards lights. Next, in operation 906, incident handling system 120 slows the vehicle down as the vehicle approaches the incident site. In operation 908, incident handling system 120 may autonomously route the vehicle to a target location around the incident site so that the vehicle may help create a barrier around the incident site.

In some embodiments, an incident handling system of one vehicle among a group of vehicles may act to coordinate the response of two or more vehicles simultaneously by communicating with those vehicles over a V2V network. For example, the incident handling system of a vehicle receiving a message indicative of an accident could communicate with nearby vehicles and coordinate the response of the two or more vehicles according to the operations shown in process 900. In particular, the incident handling system could receive a message, activate the signaling systems (such as hazard lights) of the two or more vehicles, slow the two or more vehicles as they approach the incident site, and route the two or more vehicles to suitable locations in order to create protective formations (barriers) suitable for the location, size, and type of incident. In some other embodiments, rather than having a single incident handling system coordinate the response of two or more vehicles, responses could be handled in a more cooperative manner, with multiple incident handling systems communicating over a V2V network to create a coordinated response to an incident.

Different kinds of incidents may require different kinds of responses. The embodiments may include provisions for determining the type of response (beaconing or routing). Embodiments may also include provisions for determining response details, such the type of signaling/beaconing to use and a beaconing region, for situations where beaconing is used, as well as the routing configuration for situations where routing is used. In some embodiments, algorithms may take various inputs to determine the type of response as well as beaconing and/or routing details. Exemplary inputs used by an incident handling system to make these determinations may include, for example, the type of incident (vehicle-vehicle collision, vehicle-pedestrian collision, as well as other incident types), the incident location, information about the roadway, information about nearby emergency response vehicles, information about any injuries sustained in the incident, as well as other suitable inputs.

The following includes definitions of selected terms employed herein. The definitions include various examples and/or forms of components that fall within the scope of a term and that may be used for implementation. The examples are not intended to be limiting. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The processor may be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system may include a display interface that forwards graphics, text, and other data from the communication infrastructure (or from a frame buffer) for display on a display unit. Display unit may include display, in one example. Computer system also includes a main memory, e.g., random access memory (RAM), and may also include a secondary memory. The secondary memory may include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals, which may be electronic, electromagnetic, optical or other signals capable of being received by communications interface. These signals are provided to communications interface via a communications path (e.g., channel). This path carries signals and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein may be directed to such computer program products. Communications device may include communications interface.

Computer programs (also referred to as computer control logic) are stored in main memory and/or secondary memory. Computer programs may also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software may be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the present embodiments.

The invention claimed is:

1. A motor vehicle, comprising:

a communication system for communicating with at least one other motor vehicle;

an autonomous control system for autonomously controlling the motor vehicle;

wherein the motor vehicle is configured to:

receive a message, at the communication system, indicating that a vehicle incident has occurred at a first location, the message including incident information about the vehicle incident;

retrieve, based on the incident information, a template configuration for vehicles to form a barrier around the vehicle incident, the template configuration having predetermined locations for two or more vehicles around the first location;

send one or more predetermined locations from the template configuration to one or more nearby vehicles;

and autonomously drive the motor vehicle, using the autonomous control system, to a second location selected from the predetermined locations, so that the motor vehicle and the one or more nearby vehicles form a barrier with the template configuration around the vehicle incident.

2. The motor vehicle according to claim 1, wherein the communication system is a vehicle-to-vehicle communication system.

3. The motor vehicle according to claim 1, wherein the message is received from a vehicle involved in the vehicle incident.

4. The motor vehicle according to claim 1, wherein the motor vehicle is driven to the second location to provide physical protection around the vehicle incident.

5. The motor vehicle according to claim 1, wherein the motor vehicle is further configured to activate one or more lights in response to receiving the message.

6. The motor vehicle according to claim 1, wherein the template configuration is selected from a plurality of template configurations stored in memory based on a size or type of the vehicle incident.

7. A vehicle, comprising:

a communication system for communicating with at least one other vehicle;

a signaling system comprising one or more lights;

wherein the vehicle is configured to:

receive a message, at the communication system, indicating that a vehicle incident has occurred at an incident location;

identify, from the message, a beaconing region around the incident location, the beaconing region being stationary relative to the incident location and defining a region within which vehicles are to provide visual warnings of the vehicle incident using vehicle lights;

determine, based on a current location of the vehicle, that the vehicle is within the beaconing region;

autonomously activate the signaling system including the one or more lights to provide a visual signal to warn nearby vehicles of the vehicle incident while the vehicle is within the beaconing region; and autonomously deactivate the signaling system including the one or more lights in response to determining that the vehicle has exited the beaconing region.

8. The vehicle according to claim 7, wherein the communication system is a vehicle-to-vehicle communication system.

9. The vehicle according to claim 7, wherein the beaconing region is defined by a radius around the incident location.

10. The vehicle according to claim 7, wherein the signaling system includes hazard lights.

11. The vehicle according to claim 7, wherein the beaconing region is defined by a polygonal boundary specified by GPS coordinates.

12. The vehicle according to claim 7, wherein the vehicle is further configured to autonomously drive the vehicle, using an autonomous vehicle control system, to a target location in response to receiving the message.

13. The vehicle according to claim 12, wherein the target location is one of a plurality of predetermined locations forming a barrier around the vehicle incident.

14. A method, comprising:

receiving a message, at a communication system of a motor vehicle, indicating that a vehicle incident has occurred at a first location, the message including incident information about the vehicle incident;

retrieving, based on the incident information, a template configuration for vehicles to form a barrier around the vehicle incident, the template configuration having predetermined locations for two or more vehicles around the first location;

sending one or more predetermined locations from the template configuration to one or more nearby vehicles; and autonomously driving the motor vehicle, using an autonomous control system of the motor vehicle, to a second location selected from the predetermined locations, so that the motor vehicle and the one or more nearby vehicles form a barrier with the template configuration around the vehicle incident.

15. The method according to claim 14, wherein the message is received over a vehicle-to-vehicle communication network.

16. The method according to claim 14, wherein the method further includes activating one or more lights of the motor vehicle in response to receiving the message.

17. The method according to claim 14, wherein the template configuration is selected from a plurality of template configurations stored in memory based on a size or type of the vehicle incident.

18. The method according to claim 14, wherein the template configuration includes predetermined locations that provide one or more lanes for emergency vehicles to access the vehicle incident.

19. The method according to claim 18, wherein the barrier provides physical protection around the vehicle incident.

20. The method according to claim 19, wherein the message further includes routing information and timing information to prevent collisions between the motor vehicle and the one or more nearby vehicles enroute to their respective predetermined locations.

* * * * *